United States Patent
Helberg et al.

(10) Patent No.: US 10,157,157 B2
(45) Date of Patent: Dec. 18, 2018

(54) COMPONENT POPULATION OPTIMIZATION

(71) Applicant: Dell Products, L.P., Round Rock, TX (US)

(72) Inventors: Chris M. Helberg, Austin, TX (US); Austin Michael Shelnutt, Leander, TX (US); Travis C. North, Cedar Park, TX (US); Edward Douglas Knapton, Pflugerville, TX (US)

(73) Assignee: Dell Products, L.P., Round Rock, TX (US)

( * ) Notice: Subject to any disclaimer, the term of this patent is extended or adjusted under 35 U.S.C. 154(b) by 214 days.

(21) Appl. No.: 15/269,641

(22) Filed: Sep. 19, 2016

(65) Prior Publication Data

US 2018/0081837 A1    Mar. 22, 2018

(51) Int. Cl.
  *G06F 13/36* (2006.01)
  *G06F 13/40* (2006.01)
  *G06F 13/42* (2006.01)
  *G06F 9/4401* (2018.01)

(52) U.S. Cl.
  CPC ............ *G06F 13/36* (2013.01); *G06F 9/4415* (2013.01); *G06F 13/4022* (2013.01); *G06F 13/4068* (2013.01); *G06F 13/4282* (2013.01); *G06F 2213/0024* (2013.01)

(58) Field of Classification Search
  None
  See application file for complete search history.

(56) References Cited

U.S. PATENT DOCUMENTS

| | | | | |
|---|---|---|---|---|
| 6,145,098 | A * | 11/2000 | Nouri | G06F 1/20 714/31 |
| 9,304,703 | B1 * | 4/2016 | Ignomirello | G06F 3/064 |
| 9,514,846 | B2 * | 12/2016 | Hsieh | G11O 5/04 |
| 9,563,593 | B2 * | 2/2017 | Peng | G06F 13/4068 |
| 2008/0158805 | A1 * | 7/2008 | El Bteddini | G06F 1/1613 361/679.55 |
| 2010/0140354 | A1 * | 6/2010 | Chen | G06F 11/2284 235/441 |
| 2012/0311215 | A1 * | 12/2012 | Cong | G06F 13/382 710/301 |
| 2013/0294023 | A1 * | 11/2013 | Gay | G06F 1/187 361/679.31 |

* cited by examiner

*Primary Examiner* — Elias Mamo
(74) *Attorney, Agent, or Firm* — Fogarty LLP (57) ABSTRACT

Systems and methods for component population optimization are described. In some embodiments, an Information Handling System (IHS) may include a logic circuit and a memory coupled to the logic circuit, the memory having information stored thereon that, upon access by the logic circuit, enable the IHS to: identify a connector provided on a Printed Circuit Board (PCB), wherein the connector is configured to receive a device and to couple the device to a processor; and visually indicate a status of the connector.

20 Claims, 6 Drawing Sheets

COMPONENT POPULATION OPTIMIZATION

FIELD

This disclosure relates generally to Information Handling Systems (IHSs), and more specifically, to systems and methods for component population optimization.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

A "motherboard" is the backbone of a typical IHS. Vital IHS components (e.g., processor(s), chipset(s), firmware, I/O controllers, etc.) are directly mounted on the motherboard or coupled to it via dedicated sockets. Also, the motherboard provides connections to additional components such as memory (e.g., Random Access Memory), typically via Dual In-Line Memory Module (DIMM) slots, and/or peripheral devices (e.g., modems, network cards, television tuners, radio tuners, video cards, sound cards, etc.), typically via Peripheral Component Interconnect (PCI) slots.

When a peripheral device is inserted into a PCI slot, the slot is allocated a number of PCI lanes. The number of PCI lanes available to any given slot determines the speed of communications between a device inserted into that slot and the IHS's processor.

In various deployments, different processor generations and/or types may be used with a same motherboard. And certain capabilities of a motherboard may change as a function of the processor that currently populates it. For example, in some cases, the number of available PCI lanes can vary between 44 and 16 and the number of available DIMM slots can vary between 4 and 2, depending upon which processor is being used.

In light of the foregoing, the inventors hereof have determined that it can be extremely confusing and frustrating for an end-user to try to discover a configuration that maximizes performance of an IHS. For example, it would be beneficial for a user to be able to, upon request, visually determine which specific PCI slot to plug a new device into for optimal IHS performance (especially while the IHS is powered off). Moreover, in addition to processor-specific availability of PCI lanes and DIMM slots, there are often thermal, mechanical, and signal propagation benefits to choosing a given slot over another when attempting to maximize IHS performance.

SUMMARY

Embodiments of systems and methods for component population optimization are described herein. In an illustrative, non-limiting embodiment, an Information Handling System (IHS) may include a logic circuit and a memory coupled to the logic circuit, the memory having information stored thereon that, upon access by the logic circuit, enable the IHS to: identify a connector provided on a Printed Circuit Board (PCB), wherein the connector is configured to receive a device and to couple the device to a processor; and visually indicate a status of the connector.

In some cases, the connector may be a slot or socket, and the PCB may be a motherboard. For example, the slot may be a Peripheral Component Interconnect (PCI) slot or a Dual In-Line Memory Module (DIMM) slot.

The status of the connector may be a function of the type of processor. The visual indication may be provided while the IHS is turned off. Additionally or alternatively, the visual indication may be provided before any Operating System (OS) installed in the IHS boots. Moreover, the status of the connector may include the connector being on or off and/or a number of lanes between the connector and the processor.

If the connector is unpopulated, the number of lanes may be a maximum number of lanes potentially available to the connector. If the connector is populated, the number of lanes may be a number of lanes allocated to a given device.

The IHS may also include a lighting device coupled to the logic circuit, the lighting device including a plurality of light sources, each light source associated with a different connector, each light source configured to emit at least two different colors, a first color corresponding to a first number of lanes and a second color corresponding to a second number of lanes. The IHS may further include a single switch coupled to the logic circuit, where the single switch is configured to convey a request from a user to provide the visual indication for two or more connectors, and where the information further enable the IHS to, in response to receiving the request, visually indicate to the user the number of lanes between each of the connectors and the processor.

Additionally or alternatively, the IHS may include a lighting device coupled to the logic circuit, the lighting device including a display, the display configured to display a numeral or character indicative of the number of lanes. The IHS may also include a plurality of switches, each switch uniquely associated with a corresponding connector, each switch configured to convey a request from a user to provide a visual indication for the corresponding connector.

The IHS may further include a port coupled to the logic circuit and configured to provide communications between the logic circuit and a display device external to the IHS, where visually indicating the status includes transmitting an indication of the status to the display device.

The information may enable the IHS to determine an optimal or suggested configuration for a given device to be coupled to the IHS, such that visually indicating includes identifying a selected one of a plurality of connectors suitable to receive the given device. To determine the optimal or suggested configuration, the information may further enable the IHS to: identify the processor; identify a current configuration of the IHS; and look up the optimal or suggested configuration on a table based upon the processor and the current configuration of the IHS. Additionally or alternatively, the optimal or suggested configuration may be selected based upon a parallel processing configuration for two or more devices coupled to the connectors, where the parallel processing configuration is detected by an Operating System (OS) being executed by the processor, and the OS is configured to write an indication of the status to the memory coupled to the logic circuit.

In another illustrative, non limiting embodiment, a memory device may have program instructions stored thereon that, upon access by a logic circuit of an IHS, enable the IHS to identify a Peripheral Component Interconnect (PCI) slot provided on a motherboard, wherein the PCI slot is configured to receive a PCI device and to couple the PCI device to a processor; and visually indicate a status of the PCI slot to a user while the IHS is powered off.

In yet another illustrative, non-limiting embodiment, a method may include identifying a Dual In-Line Memory Module (DIMM) slot provided on a motherboard, wherein the DIMM slot is configured to receive a DIMM and to couple the DIMM to a processor; and visually indicating a status of the DIMM slot to a user while the IHS is powered off.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Embodiments described herein enable component population optimization in Information Handling Systems (IHSs). In certain illustrative, non-limiting examples, an IHS may include a Printed Circuit Board (PCB) or "motherboard" configured to receive any of a number of processors of different manufacturers, models, versions, etc. The motherboard may also include a plurality of connectors, such as Dual In-Line Memory Module (DIMM) and/or Peripheral Component Interconnect (PCI) slots, that allow memory components (e.g., Random Access Memory or RAM) and/or peripheral components (e.g., video cards, etc.) to be coupled to the IHS, respectively.

Depending upon the processor installed in the IHS, a given DIMM slot may be on or off—that is, the slot may be available to receive a DIMM or not. Also, depending upon the processor, each PCI slot may be allocated a different number of PCI lanes. Each "lane" of a PCI connection contains two pairs of wires (one to send and one to receive). Packets of data move across the lane at a rate of one bit per cycle. An "×1" connection has one lane made up of four wires, and it carries one bit per cycle in each direction. An "×2" link contains eight wires and transmits two bits at once, an "×4" connection transmits four bits at once, and so on. As such, the number of PCI lanes available to a PCI slot determines the bandwidth or speed of communications between a component inserted into that slot and the processor.

In various embodiments, a logic circuit or controller disposed on the IHS's motherboard may be configured to provide a visual indication of DIMM and/or PCI status for each DIMM and/or PCI slot.

For instance, after the IHS's Basic Input/Output System (BIOS) finishes its Power-On Self-Test procedure, the logic circuit—which may be provided, for example, a part of the BIOS or as a separate controller or chip—may create a table in non-volatile memory that identifies a PCI lane status for each PCI slot (e.g., number of PCI lanes available to an unpopulated or "empty" PCI slot, a number of PCI lanes currently being used by a component inserted into a given PCI slot, etc.) and a DIMM status for each DIMM slot (e.g., on, off, etc.).

Using a battery or the IHS's power supply when the IHS is in an otherwise powered-off state, a user may activate a single switch on the motherboard that allows the logic circuit to control the illumination of Light-Emitting Diodes (LEDs), each LED associated with a corresponding PCI and/or DIMM slot. In some implementations, LEDs may be RGB LEDs. In other implementations, LEDs may be bi-color LEDs with blinking capabilities. An illumination characteristic (e.g., color, blinking frequency, etc.) of each LED may be controlled to convey, for its corresponding slot, a number of PCI lanes and/or DIMM status.

Additionally or alternatively, individual switches may be paired with individual PCI and/or DIMM slots. The user may activate each switch associated with each corresponding slot to allow the logic circuit to control the illumination of an LED and/or other display device (e.g., a Liquid Crystal Display or LCD module). Additionally or alternatively, a display device may be external to the IHS and PCI lane and/or DIMM status information may be transmitted from the logic circuit to the external display device using a wired or wireless port.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes.

For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a CPU or hardware or software control logic, Read-Only Memory (ROM), and/or other types of nonvolatile memory.

Additional components of an IHS may include one or more disk drives, one or more network ports for communicating with external devices as well as various input/output (I/O) devices, such as a keyboard, a mouse, a touchscreen, and/or a video display. An IHS may also include one or more buses operable to transmit communications between the various hardware components. An example of an IHS is described in more detail below.

Figure 1:
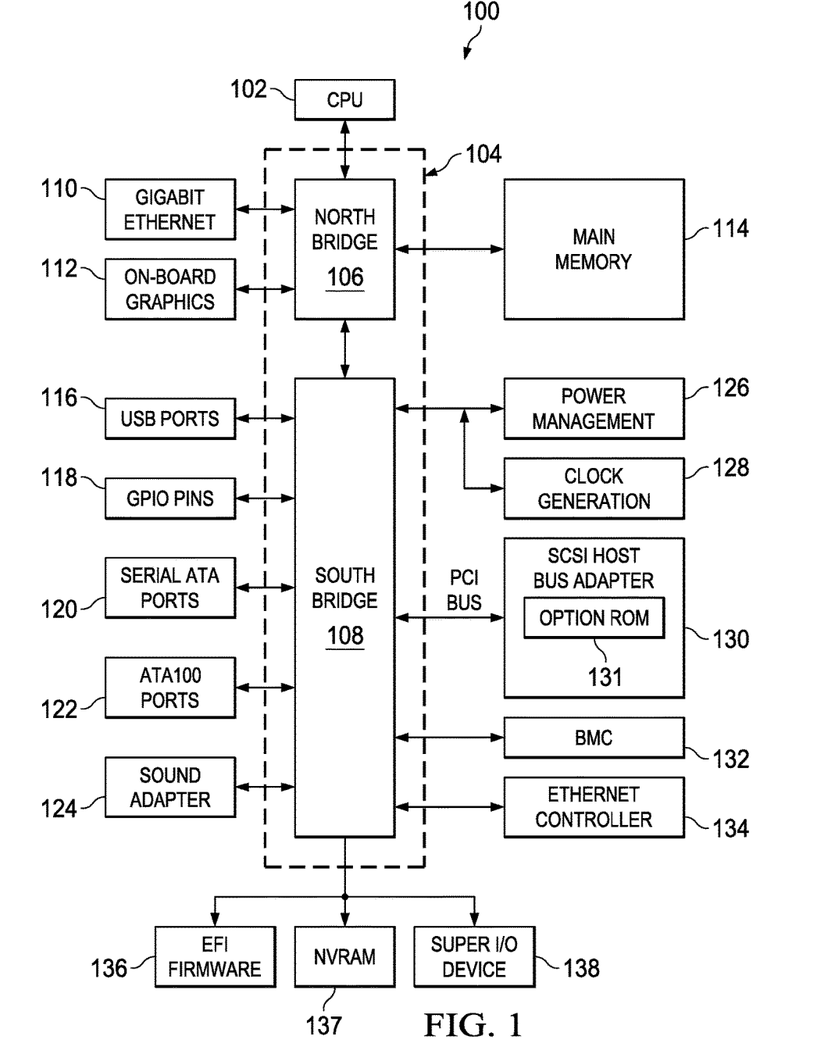
FIG. 1 is a block diagram of an example of an Information Handling System (IHS) configured to implement systems and methods described in various embodiments.

FIG. 1 shows an example of an IHS configured to implement systems and methods described herein. It should be appreciated that although certain embodiments described herein may be discussed in the context of a desktop or server computer, other embodiments may be utilized with virtually any type of IHS. In this example, the IHS is configured to provide component population optimization, as explained in more detail below.

Particularly, the IHS includes a baseboard or motherboard 100, which is a printed circuit board (PCB) to which components or devices are mounted to by way of a bus or other electrical communication path. For example, CPU 102 operates in conjunction with a chipset 104; CPU 102 is a processor or microprocessor that performs arithmetic and logical operations necessary for the functioning of the IHS.

Chipset 104 includes northbridge 106 and southbridge 108. Northbridge 106 provides an interface between CPU 102 and the remainder of the IHS. Northbridge 106 also provides an interface to main memory 114 in the IHS and, possibly, to on-board graphics adapter 112. Northbridge 106 may also be configured to provide networking operations through Ethernet adapter 110. Ethernet adapter 110 is capable of connecting the IHS to another IHS (e.g., a remotely located IHS) via a network. Connections which may be made by network adapter 110 may include local area network (LAN) or wide area network (WAN) connections. Northbridge 106 is also coupled to southbridge 108.

Southbridge 108 is responsible for controlling many of the I/O operations of the IHS. In particular, southbridge 108 may provide one or more universal serial bus (USB) ports 116, sound adapter 124, Ethernet controller 134, and one or more general purpose input/output (GPIO) pins 118. Southbridge 108 may also provide a bus for interfacing peripheral card devices such as BIOS boot system-compliant SCSI host bus adapter 130. In some embodiments, the bus may include a PCI bus. Southbridge 108 may also provide baseboard management controller (BMC) 132 for use in managing the various components of the IHS. Power management circuitry 126 and clock generation circuitry 128 may also be utilized during the operation of southbridge 108.

Additionally, southbridge 108 is configured to provide one or more interfaces for connecting mass storage devices to the IHS. For instance, in an embodiment, southbridge 108 may include a serial advanced technology attachment (SATA) adapter for providing one or more serial ATA ports 120 and/or an ATA100 adapter for providing one or more ATA100 ports 122. Serial ATA ports 120 and ATA100 ports 122 may be, in turn, connected to one or more mass storage devices storing an OS and application programs. An OS comprises a set of programs that control operations of the IHS and allocation of resources. An application program is software that runs on top of the OS and uses computer resources made available through the OS to perform application specific tasks desired by the user.

Mass storage devices connected to southbridge 108 and SCSI host bus adapter 130, and their associated computer-readable media provide non-volatile storage for the IHS. Although the description of computer-readable media contained herein refers to a mass storage device, such as a hard disk or CD-ROM drive, it should be appreciated a person of ordinary skill in the art that computer-readable media can be any available media on any memory storage device that can be accessed by the IHS. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count (LPC) interface may also be provided by southbridge 108 for connecting Super I/O device 138. Super I/O device 138 is responsible for providing a number of I/O ports, including a keyboard port, a mouse port, a serial interface, a parallel port, and other types of input/output ports.

The LPC interface may connect a computer storage media such as a ROM or a flash memory such as a non-volatile random access memory (NVRAM) for storing BIOS/firmware 136 that includes BIOS program code containing the basic routines that help to start up the IHS and to transfer information between elements within the IHS. BIOS/firmware 136 comprises firmware compatible with the EFI Specification and Framework.

The LPC interface may also be utilized to connect NVRAM 137 to the IHS. NVRAM 137 may be utilized by BIOS/firmware 136 to store configuration data for the IHS. In other embodiments, configuration data for the IHS may be stored on the same NVRAM 137 as BIOS/firmware 136.

BMC 132 may include non-volatile memory having program instructions stored thereon that enable remote management of the IHS. For example, BMC 132 may enable a user to discover, configure, and manage the IHS, setup configuration options, resolve and administer hardware or software problems, etc. Additionally or alternatively, BMC 132 may include one or more firmware volumes, each volume having one or more firmware files used by the BIOS' firmware interface to initialize and test components of the IHS. In some implementations, the systems and methods described herein may be used to test the resiliency and recover-ability of services running in BMC 132.

As a non-limiting example of BMC 132, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state, because iDRAC is embedded within the IHS from the factory.

It should be appreciated that, in other embodiments, the IHS may comprise any device that executes software with error handling capabilities, including embedded systems such as, for example, cable-top boxes, phones, media devices, game consoles, telephony equipment, traffic lights, automotive vehicles, avionics, factory controllers, etc. Each of these devices may have its own requirements for robustness and reliability, and may need to handle of errors that may occur during operation. It is also contemplated that an IHS may not include all of the components shown in FIG. 1, may include other components that are not explicitly shown, or may utilize a different architecture.

Figure 2A:
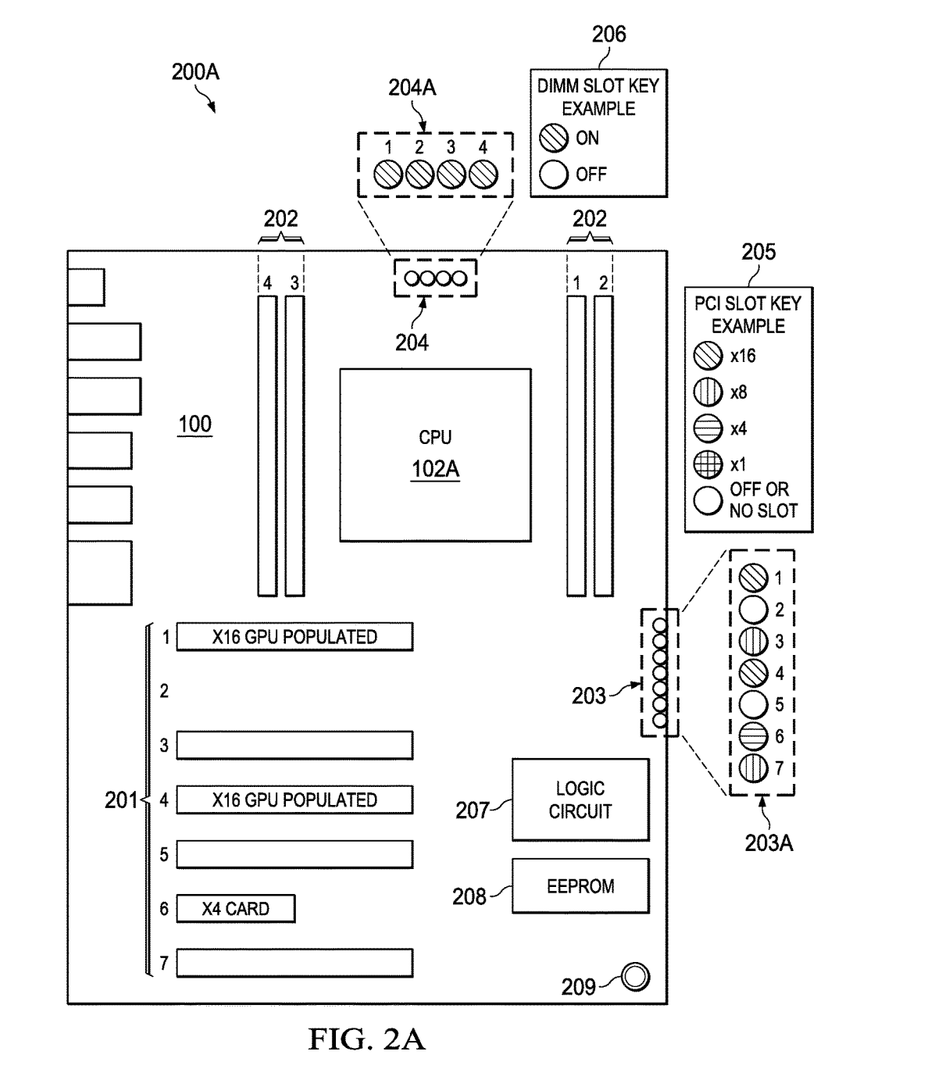
FIGS. 2A and 2B are diagrams illustrating examples of systems configured to perform component population optimization for different processors on a same motherboard, according to various embodiments.
Figure 2B:
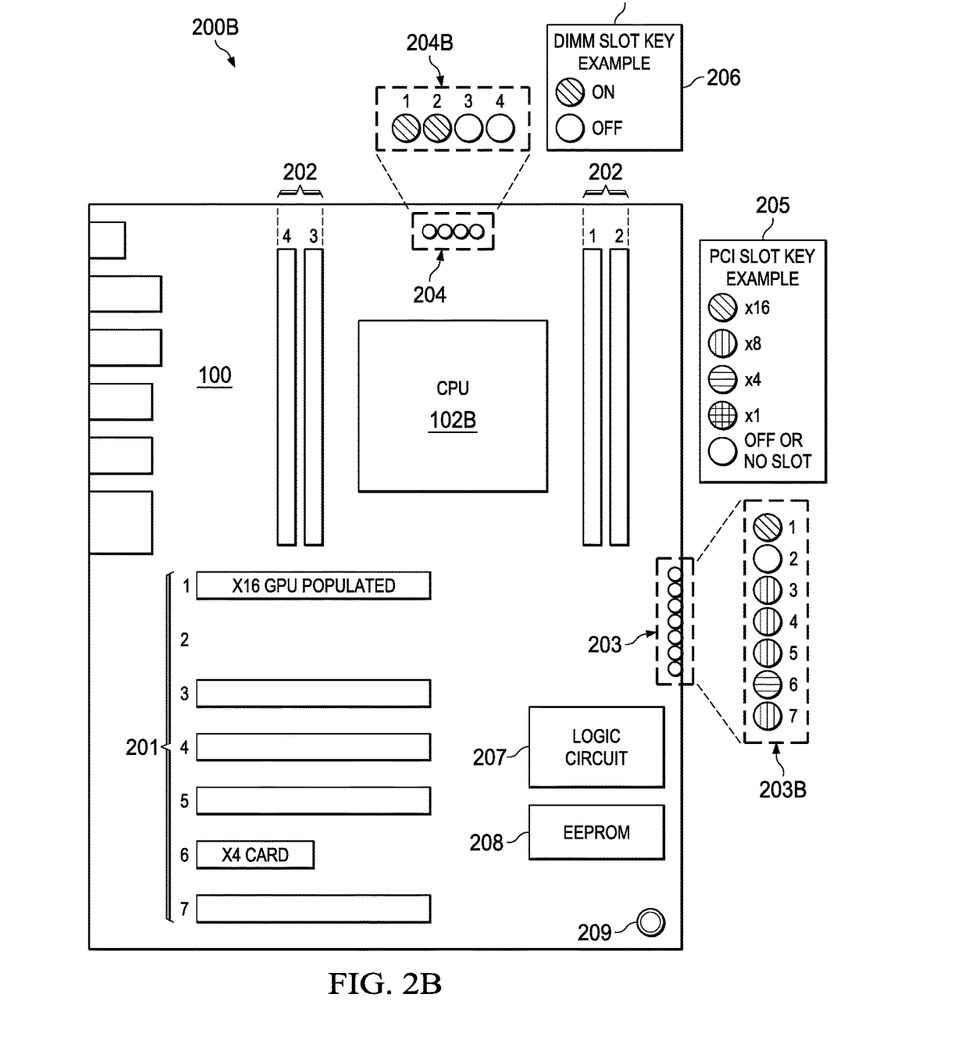

Turning now to FIGS. 2A and 2B, system 200A is configured to perform component population optimization when first CPU 102A is installed, and system 200B is configured to perform component population optimization when second CPU 102B is installed. Each system includes the same motherboard 100 having PCI slots 201, DIMM slots 202, PCI lighting devices 203, DIMM lighting devices 204, logic circuit 207, EEPROM 208, and master switch or button 209. Moreover, each of these components may be directly mounted on motherboard 100 using traditional chip mounting techniques, dedicated sockets, or in any other suitable way.

In some implementations, PCI key or legend 205 and/or DIMM key or legend 206 may be silkscreened or otherwise provided on motherboard 100 (e.g., a sticker or decal). In these examples, PCI lighting devices 203 and DIMM lighting devices 204 are sets of LEDs, each LED corresponding to an individual one of PCI slots 201 or DIMM slots 202. Accordingly, legend 205 shows to a user the relationship between different LED colors and PCI slot status (e.g., "×16," "×8," "×4," "×1," or "off"). Similarly, key 206 displays the relationship between LED colors and DIMM slot status (e.g., "on" or "off").

In system 200A of FIG. 2A, processor 102A is capable of using a first, a second, a third, and a fourth DIMM slot (status is "on"). As such, DIMM LEDs 204A corresponding to DIMM slots 1-4 emit a color conveying an "on status." However, in system 200B of FIG. 2B, processor 102B is capable of using the first and second DIMM slots (status is "on"), but not the third or fourth DIMM slots (status is "off"). Hence, those among DIMM LEDs 204A that correspond to DIMM slots 1 and 2 emit a color conveying an "on status" (e.g., green), and those among DIMM LEDs 204A corresponding to DIMM slots 3 and 2 assume a different color conveying an "off status" (e.g., red).

To illustrate the foregoing, assume that, while the IHS is powered off, a user desires to increase the RAM of IHS by inserting another stick or DIMM into one of DIMM slots 202. To determine which slot to plug the DIMM into, the user may activate switch 209 (e.g., by pressing a push button), which in turn causes logic circuit 207 to control DIMM lighting device 204 based upon information stored in EEPROM 208.

In system 200A, all LEDs 204A in DIMM lighting device 104 turn on to indicate that all DIMM slots 202 are available to processor 102A. In system 200B, however, only those of LEDs 204B corresponding to DIMM slots 1 and 2 light up to indicate availability, whereas those of LEDs 204B associated with DIMM slots 3 and 4 remain turned off to indicate unavailability. As such, the user may, upon visual inspection and while the IHS is powered-off, determine an optimal or suitable DIMM slot for additional DIMMs that any processor installed on motherboard 100 is capable of handling.

In system 200A, processor 102A is capable of using 44 PCI lanes. The optimal configuration for system 200A, in example 203A, is to assign 16 PCI lanes to PCI slot 1 (it already has a ×16 card inserted therein), leave PCI slot 2 unused, make a maximum of 8 PCI lanes available to unpopulated PCI slot 3, assign another 16 PCI lanes to PCI slot 4 (it also already has a ×16 card), leave PCI slot 5 unused, make a maximum of 4 PCI lanes available to unpopulated PCI slot 6, and then make a maximum of 8 PCI lanes available to unpopulated PCI slot 7.

In contrast, in system 200B, processor 102B is only capable of using 28 PCI lanes. The optimal configuration for system 200B, in example 203B, is to assign 16 PCI lanes to PCI slot 1 (it already has a ×16 card inserted therein), leave PCI slot 2 unused, make a maximum of 8 PCI lanes available to each of unpopulated PCI slots 3, 4, 5, and 7, and assign 4 PCI lanes to PCI slot 6 (it already has a ×4 card).

In various embodiments, when a given one of PCI slots 201 has a device or component inserted therein, the status of that slot includes an indication of how many PCI lanes have actually already been assigned to that slot or device. In contrast, when a given one of PCI slots 201 is unpopulated, the status of that slot includes an indication of the maximum number of PCI lanes that can potentially be assigned to that slot or device.

For example, in FIG. 2B, the status of slot 1 shows "×16" and the status of slot 5 is "×4," meaning that a device already inserted into slot 1 has access to 16 PCI lanes, and another device already inserted into slot 6 has access to 4 PCI lanes. All other slots are unpopulated. Because CPU 102B only supports 28 PCI lanes, there are only 8 PCI lanes available, and any of slots 3, 4, 5, or 7 may be configured to use the 8 remaining lanes. If an ×8 card is inserted into slot 3, for example, there will be no more lanes left, and the status of slots 4, 5, and 7 are each updated to indicate that no PCI lanes are left, therefore all remaining PCI slots are off.

In the preceding examples, one or more DIMM slots 202 and/or one or more PCI slots 201 are turned off, inactive, or absent (e.g., DIMM slots 3 and 4 and PCI slot 2 in FIG. 2B). In these cases, when the user decides to insert a device into a new DIMM or PCI slot, the user can determine whether that particular slot is available. Particularly in the case of PCI slots 203, the user may also determine the maximum possible bandwidth (e.g., number of PCI lanes) that can be allocated to that slot.

Figure 3:
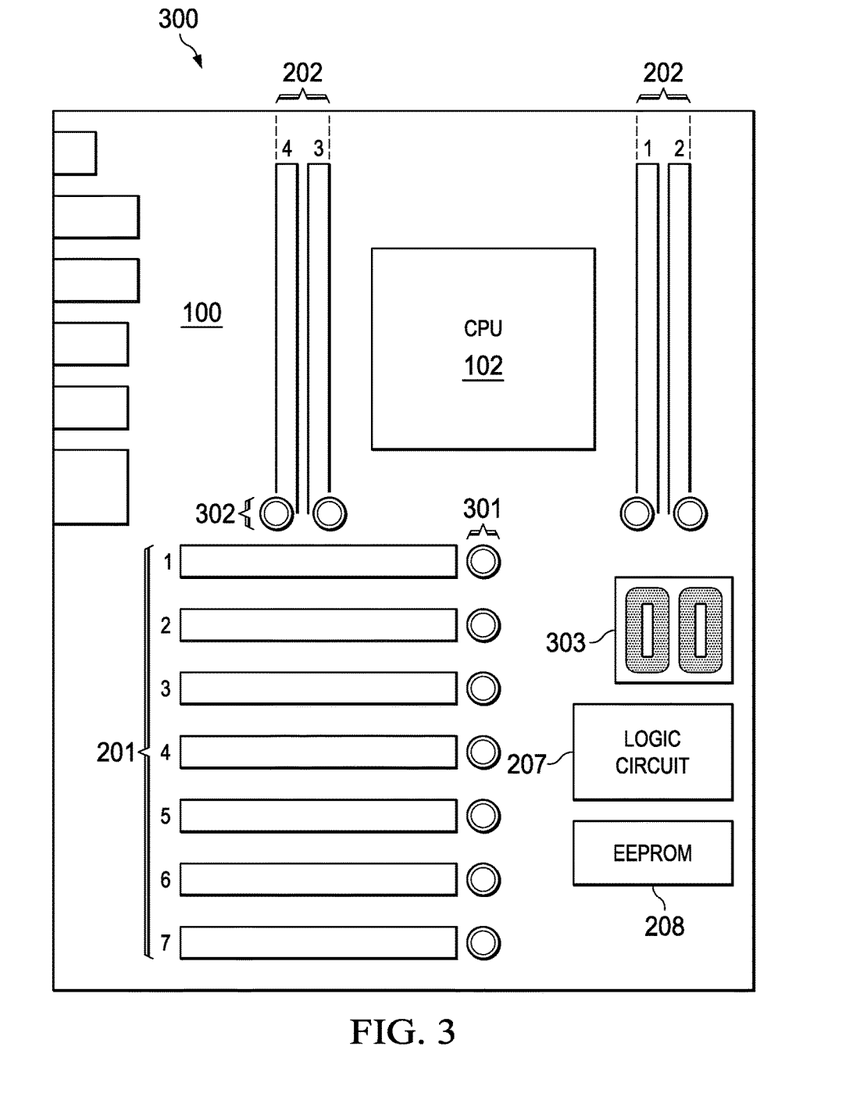
FIG. 3 is a diagram illustrating an example of another system configured to perform component population optimization according to various embodiments.

FIG. 3 is a diagram illustrating an example of another system 300 configured to perform component population optimization according to various embodiments. In this example, system 300 includes motherboard 100, CPU 102, PCI slots 201, DIMM slots 202, logic circuit 207, EEPROM 208, PCI switches or buttons 301, DIMM switches or buttons 302, and LCD display 303. Each PCI slot 1-7 is associated with its own dedicated one of switches 301, and each DIMM slot 1-4 is associated with its own dedicated one of switches 302.

To determine the status of a particular slot, the user may press a corresponding switch, and logic circuit 207 may display the current status of that slot. For example, in the case of DIMM slots 202, display 303 may indicate whether a particular slot is on or off. In the case of PCI slots 301, display 303 may show the number of PCI lanes already assigned to an existing device inserted into a particular slot or, if the slot is unpopulated, the maximum possible number of PCI lanes that can be allocated to that slot.

Figure 4:
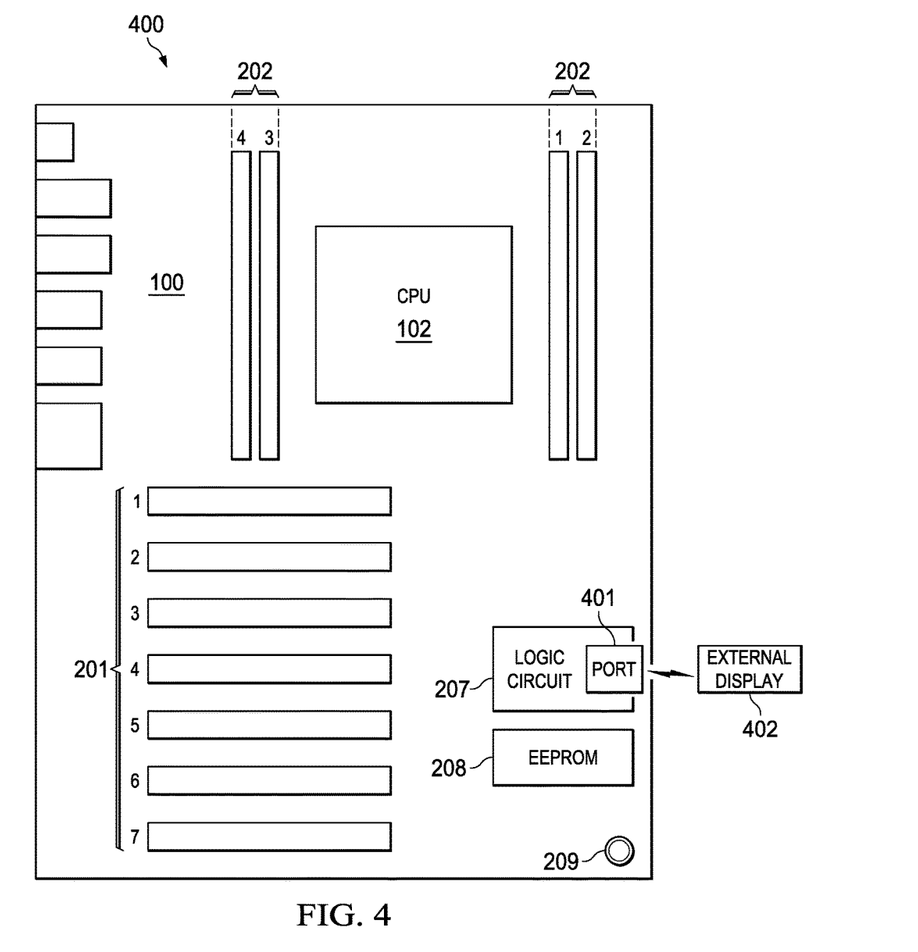
FIG. 4 is a diagram illustrating an example of yet another system configured to perform component population optimization according to various embodiments.

FIG. 4 is a diagram illustrating an example of yet another system 400 configured to perform component population optimization according to various embodiments. In this example, system 400 includes motherboard 100, CPU 102, PCI slots 201, DIMM slots 202, logic circuit 207, EEPROM 208, and master switch or button 209. In this instance, logic circuit 207 includes port 401 that provides, for example, serial communications capabilities using a wired (e.g., USB) or wireless protocol (e.g., WiFi, Bluetooth, etc.).

In some cases, external display 402 may be a part of an external or secondary device (e.g., another IHS) in communication with logic circuit 207. To determine the status of any particular slot on motherboard 100, the user may press or activate master switch or button 209, and logic circuit 207 may transmit slot status information to the secondary device, such that external display 402 performs operations similar to those of display 303 in FIG. 3, but as part of a Graphical User Interface (GUI) or the like.

Figure 5:
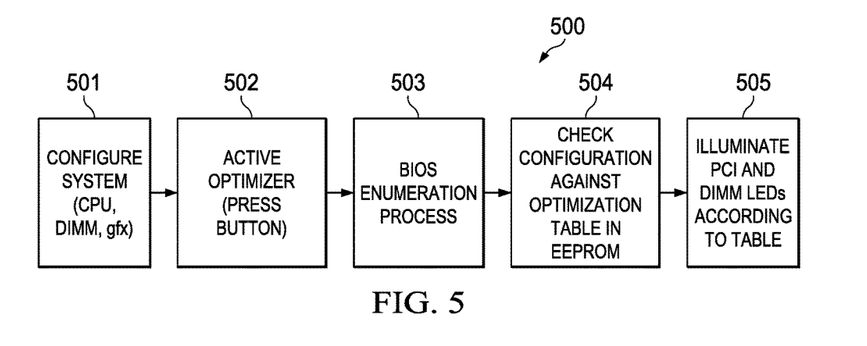
FIG. 5 is a flowchart of an example of a component population optimization method according to various embodiments.

FIG. 5 is a flowchart of an example of a component population optimization method 500 according to various embodiments. At block 501, method 500 configures an IHS (e.g., CPU(s), DIMM(s), GPU(s), etc.). At block 502, a user activates the optimizer system, for example, by pressing a push button disposed on the IHS's motherboard. At block 503, the BIOS begins its enumeration process. At block 504, method 500 checks the configuration resulting from the enumeration against an optimization table stored in non-volatile memory. Then, at block 505, method 500 illuminates PCI and DIMM LEDs (or otherwise provides a visual indication of the PCI and DIMM slots' status) according to the table.

Upon completion of method 500, EEPROM 208 stores an optimization table that takes into account CPU and/or motherboard manufacturer recommendations. Additionally or alternatively, the optimization table may be further refined by an IHS manufacturer for a particular IHS build with the goal of optimizing latency, thermal design, speed, and/or signal integrity for that build or type of build—which, ordinarily, CPU and motherboard manufacturers would have little or no visibility into. After the optimization table is stored in EEPROM 208, logic circuit 207 may read that information (e.g., when the user pushes button 209) and use it to control lighting or display devices 203, 204, 303, or 402 to visually indicate the status of each slot or connector provided on the motherboard, for example, when the IHS is powered off.

In some cases, after the IHS boots and an Operating System (OS) takes over, the user may employ the OS to set a specific mode of operation with respect to PCI devices, as an example. For instance, the OS may set two PCI graphics cards in Scalable Link Interface (SLI) mode. In that case, if the first graphics cards is inserted into an ×8 PCI slot, even if the second graphics card can operate with 16 PCI lanes, the OS nonetheless causes the processor to assign only 8 PCI lanes to the second card, so that each of the two graphics cards can operate with the same number of PCI lanes. That is, in SLI mode, the OS forces a ×16 card to operate with only ×8 lanes, which releases 8 PCI lanes for other PCI slots.

To address these cases, the BIOS or the OS may be allowed write to the optimization table in EEPROM 208 to account for special lane configurations or to introduce mode flags. Upon detecting the special configuration or flag, logic circuit 207 may identify and allocate these "left-over" PCI lanes to other PCI slots, regardless of whether those lanes have already been assigned to a given slot.

Figure 6:
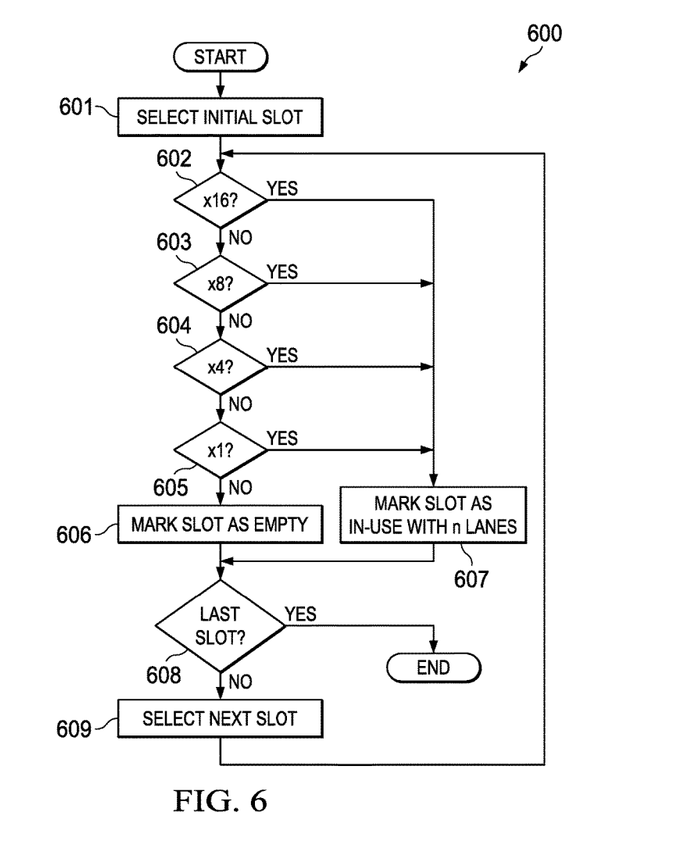
FIG. 6 is a flowchart of an example of an enumeration method according to various embodiments.

FIG. 6 is a flowchart of an example of a PCI slot BIOS enumeration method 600 according to various embodiments. In some cases, method 600 may be used as block 503 of FIG. 5. At block 601, method 600 selects an initial PCI slot (e.g., slot 1). At blocks 602-605, method 600 determines whether the slot has been populated with a component or device that has been allocated 16, 8, 4, or 1 PCI lane(s), respectively. If so, block 607 marks the slot as in-use with n PCI lanes. Otherwise, the slot is determined to be unpopulated or empty at block 606. At block 608, method determines whether the current slot is the last PCI slot on the motherboard. If so, method 600 ends. If not, block 609 selects the next slot (e.g., slot 2), and control returns to block 602.

Although many of the examples described above discuss DIMM and PCI slots in particular, it should be noted that these specific technologies are provided for sake of illustration only. More generally, the techniques described herein are applicable to any type of connector, socket, or slot with configurations and/or characteristics (e.g., on or off, number of lanes or bandwidth being used in a populated connector, maximum number of lanes or bandwidth available in an unpopulated connector, etc.) that can change depending upon which CPU is being used.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a logic circuit; and
a memory coupled to the logic circuit, the memory having information stored thereon that, upon access by the logic circuit, enable the IHS to:
identify a connector provided on a Printed Circuit Board (PCB), wherein the connector is configured to receive a device and to couple the device to a processor; and
visually indicate a status of the connector, wherein the information further enables the IHS to determine an optimal or suggested configuration for a given device to be coupled to the IHS, and wherein visually indicating includes identifying a selected one of a plurality of connectors suitable to receive the given device.

2. The IHS of claim 1, wherein the connector is a slot or socket, and wherein the PCB is a motherboard.

3. The IHS of claim 2, wherein the slot is a Peripheral Component Interconnect (PCI) slot or a Dual In-Line Memory Module (DIMM) slot.

4. The IHS of claim 1, wherein the visual indication is provided while the IHS is turned off.

5. The IHS of claim 1, wherein the visual indication is provided before any Operating System (OS) installed in the IHS boots.

6. The IHS of claim 1, wherein the status of the connector includes the connector being on or off.

7. The IHS of claim 1, wherein the status of the connector includes a number of lanes between the connector and the processor.

8. The IHS of claim 1, wherein the connector is unpopulated, and wherein the number of lanes is a maximum number of lanes potentially available to the connector.

9. The IHS of claim 1, wherein the connector is populated by a given device, and wherein the number of lanes is a number of lanes allocated to the given device.

10. The IHS of claim 7, further comprising a lighting device coupled to the logic circuit, the lighting device including a plurality of light sources, each light source associated with a different connector, each light source configured to emit at least two different colors, a first color corresponding to a first number of lanes and a second color corresponding to a second number of lanes.

11. The IHS of claim 7, further comprising a lighting device coupled to the logic circuit, the lighting device including a display, the display configured to display a numeral or character indicative of the number of lanes.

12. The IHS of claim 1, further comprising a port coupled to the logic circuit and configured to provide communications between the logic circuit and a display device external to the IHS, wherein visually indicating the status includes transmitting an indication of the status to the display device.

13. The IHS of claim 1, wherein to determine the optimal or suggested configuration, the information further enables the IHS to:
  identify the processor;
  identify a current configuration of the IHS; and
  look up the optimal or suggested configuration on a table based upon the processor and the current configuration of the IHS.

14. The IHS of claim 13, wherein the optimal or suggested configuration is selected based upon a parallel processing configuration for two or more devices coupled to the connectors, wherein the parallel processing configuration is detected by an Operating System (OS) being executed by the processor, and wherein the OS is configured to write an indication of the status to the memory coupled to the logic circuit.

15. A memory device having program instructions stored thereon that, upon access by a logic circuit of an Information Handling System (IHS), enable the IHS to:
  identify a Peripheral Component Interconnect (PCI) slot provided on a motherboard, wherein the PCI slot is configured to receive a PCI device and to couple the PCI device to a processor; and
  visually indicate a status of the PCI slot to a user, including a number of lanes between the PCI slot and the processor, using at least one of: (i) a lighting device comprising a plurality of light sources, each light source associated with a different PCI connector, each light source configured to emit at least two different colors, a first color corresponding to a first number of lanes and a second color corresponding to a second number of lanes; or (ii) a display configured to indicate the number of lanes.

16. In an Information Handling System (IHS), a method comprising:
  identifying a Dual In-Line Memory Module (DIMM) slot provided on a motherboard, wherein the DIMM slot is configured to receive a DIMM and to couple the DIMM to a processor; and
  visually indicating a status of the DIMM slot to a user, including a number of lanes between the DIMM slot and the processor, using at least one of: (i) a lighting device comprising a plurality of light sources, each light source associated with a different DIMM connector, each light source configured to emit at least two different colors, a first color corresponding to a first number of lanes and a second color corresponding to a second number of lanes; or (ii) a display configured to indicate the number of lanes.

17. The memory device of claim 15, wherein a single switch is coupled to the logic circuit, wherein the single switch is configured to convey a request from a user to provide the visual indication for two or more PCI connectors.

18. The memory device of claim 15, wherein each of a plurality of switches is uniquely associated with a corresponding PCI connector, and wherein each switch is configured to convey a request from a user to provide a visual indication for the corresponding PCI connector.

19. The method of claim 16, wherein a single switch is coupled to the logic circuit, wherein the single switch is configured to convey a request from a user to provide the visual indication for two or more DIMM connectors.

20. The method of claim 16, wherein each of a plurality of switches is uniquely associated with a corresponding DIMM connector, and wherein each switch is configured to convey a request from a user to provide a visual indication for the corresponding DIMM connector.

* * * * *